April 23, 1968     S. E. RICHESON     3,379,117
PROGRAMMED AUTOMATIC COFFEE MACHINE
Filed Oct. 22, 1965     4 Sheets-Sheet 1

INVENTOR
SANFORD E. RICHESON

BY *Paris, Haskell & Levine*
ATTORNEYS

April 23, 1968     S. E. RICHESON     3,379,117
PROGRAMMED AUTOMATIC COFFEE MACHINE
Filed Oct. 22, 1965     4 Sheets-Sheet 2
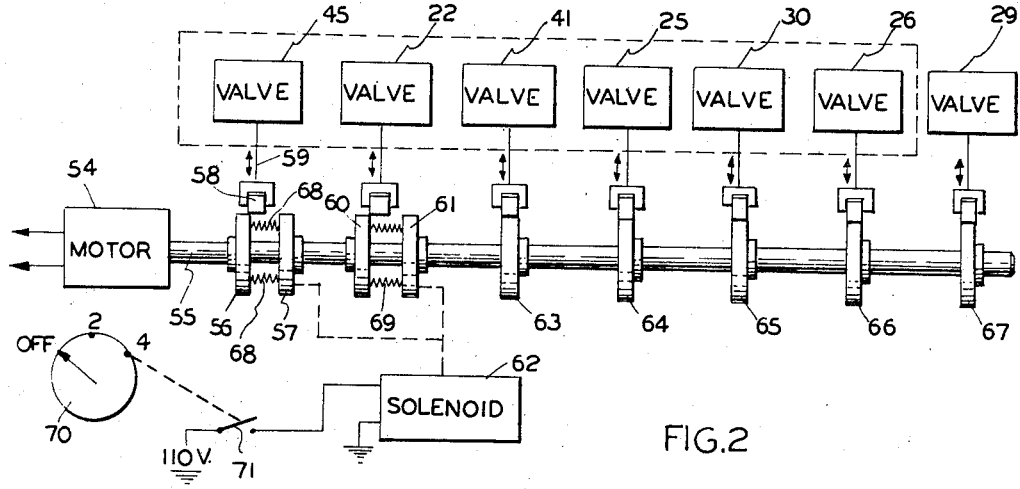
FIG. 2
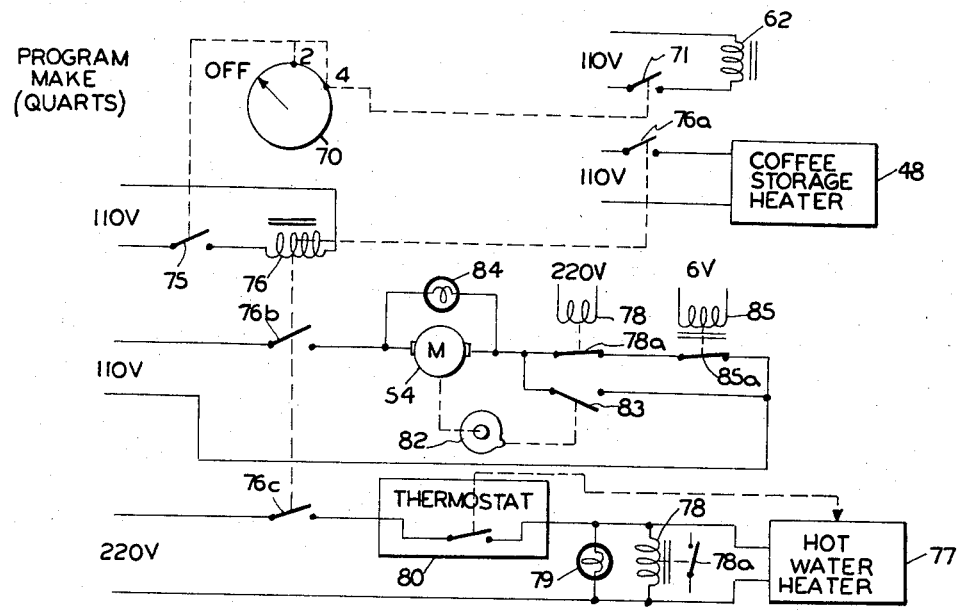
FIG. 3
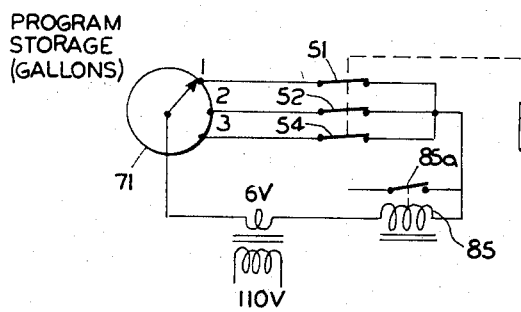
INVENTOR
SANFORD E. RICHESON
BY *Paris, Haskell & Levine*
ATTORNEYS April 23, 1968  S. E. RICHESON  3,379,117
PROGRAMMED AUTOMATIC COFFEE MACHINE
Filed Oct. 22, 1965  4 Sheets-Sheet 3

INVENTOR
SANFORD E. RICHESON

BY *Paris, Haskell & Levine*

ATTORNEYS

INVENTOR
SANFORD E. RICHESON

United States Patent Office 3,379,117
Patented Apr. 23, 1968

3,379,117
PROGRAMMED AUTOMATIC COFFEE MACHINE
Sanford E. Richeson, Brooklyn, N.Y., assignor to
Alfred B. Levine, Chevy Chase, Md.
Filed Oct. 22, 1965, Ser. No. 501,153
19 Claims. (Cl. 99—283)

ABSTRACT OF THE DISCLOSURE

A cyclically operating coffee beverage making machine that during each cycle automatically prepares and dispenses a preadjustable quantity of beverage. The machine incorporates adjustable programming enabling a human operator to preselect the storage of a given quantity of beverage wherein the machine automatically recycles as required to maintain this preselected stored quantity. An independent programming mechanism permits the human operator to also preselect the quantity of beverage produced during each cycle.

---

Figure 1:
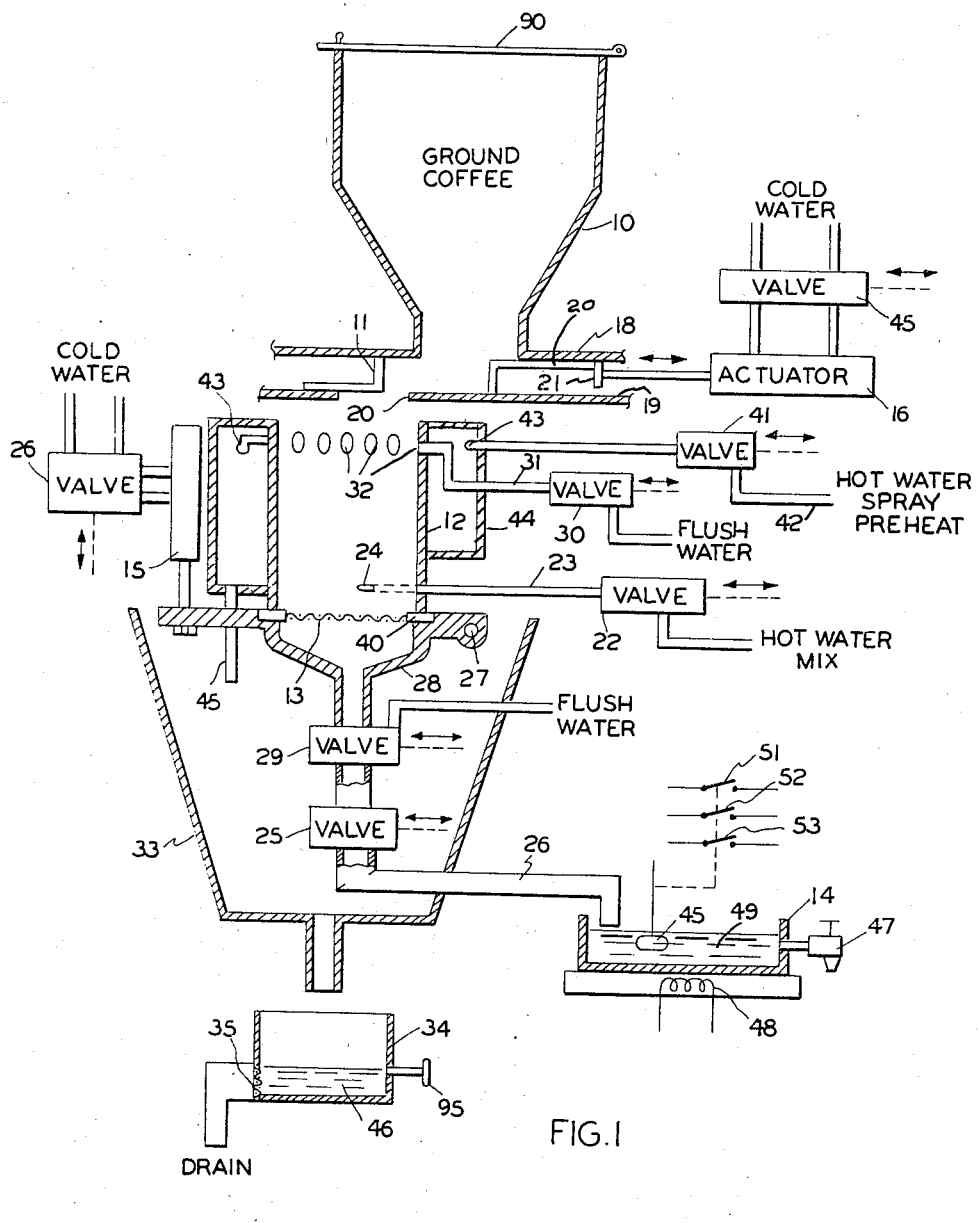

This invention relates to improvements in commercial coffee brewing machines for restaurants and is particularly concerned with a machine that is fully automatic in operation and is programmable to automatically prepare and store the beverage in presettable quantities.

In the past two types of commercial coffee machines have been available for use in restaurants; the completely manual type machines, typified by the large urns, where the ground coffee and hot water are manually inserted and many gallons of coffee are made and stored until used, and the semi-automatic machines in which a smaller quantity of ground coffee is manually inserted and the machine dispenses hot water to infuse and extract the beverage. In both types, the expended coffee grounds are manually removed after each preparation and portions of the machine are manually cleaned and readied for the next use with the filter being either manually cleaned or replaced.

Both types of machines have a number of disadvantages in addition to the time and expense occasioned by the manual operations of inserting the ingredients, removing the expended coffee grounds and otherwise readying the machine for each operation. The large urns suffer from the disadvantage of producing a large quantity of coffee beverage that must be stored until used or discarded periodically if freshly prepared coffee is desired. This is not only wasteful and expensive, but most usually the consumer is served coffee that has been brewed some hours before. Since the beverage loses much of its flavor and essence when stored for prolonged periods the coffee being served leaves much to be desired. The semi-automatic machines on the other hand are not subject to this disadvantage since they can produce the beverage in smaller quantities, usually in quantities of one half gallon, but on the other hand require many steps of manual preparation for each quantity prepared and therefore require frequent making of coffee during the busy hours of the restaurant and quite often divert the waitresses or kitchen help from other necessary duties. During rush hours it is not unusual for service to be slow for the customer to wait while the coffee is prepared.

To overcome these disadvantages of the commercially available machines, many efforts have been made to provide fully automatic machines but up to the present time very few, if any, of such fully automatic machines have found commercial acceptance. The patented art is replete with many patents purporting to provide machines for automatically preparing coffee but the suggested machines have not only been too expensive, complex, and troublesome for restaurant uses but have not fully satisfied the varying requirements of the restaurants for greater and lesser quantities of coffee at different times of the day to satisfy the cyclic mealtime needs of the diners.

According to the present invention there is provided a fully automatic coffee machine that is programmable to vary both the quantity of coffee beverage prepared during each cycle and also independently programmable to vary the quantity of beverage stored. In this manner, the restaurant can selectively change the brewing capacity and storage capacity of the machine according to varying peak requirements during the day in such manner as to always provide freshly prepared beverage in sufficient quantity when needed yet materially reduce the amount of beverage that must be discarded or served in degraded quality after prolonged periods of storage. The machine is additionally fully automatic in operation as opposed to the manual and semi-automatic machines as discussed above whereby it does not require frequent periodic insertion of ingredients, removal of expended coffee grounds, cleaning of the brewing chamber, or frequent cleaning or replacement of the filter element.

In a preferred embodiment, the machine automatically functions to premeasure and thoroughly mix ground coffee and hot water in an infusion container, filters the infused beverage from the expended coffee grounds, stores the beverage at constant temperature in a dispensing container, cleans the infusion cylinder, filter and related parts in preparation for the next cycle of operation, and collects the expended coffee grounds for later removal at the convenience of the restaurant. The machine is easily preprogrammable by an operator to selectively vary the quantities of ingredients that are mixed in the infusion container during each cycle thereby to vary the quantity of beverage produced. The machine is also easily preprogrammable by an operator to vary the quantity of beverage stored in a dispensing container and is automatically controlled to continuously or continually cycle and maintain this preselected stored quantity constant.

It is accordingly a principal object of the invention to provide a machine that performs the above functions; that is dependable in operation; that requires infrequent attention or servicing; and that is comparable in size, weight, and cost to present commercially available semi-automatic or manual machines.

A significant object of the invention is to provide such a machine providing a superior quality of coffee beverage by precisely controlling the parameters of the beverage making process.

A still further object is to provide such a machine that minimizes the need for manual attention or servicing.

Another object is to provide an improved cabinet for such a machine having a modular construction that permits very rapid access to the operating parts and controls and ready removal and replacement of parts so as to minimize the time of repair should repairs become necessary.

A further object of the invention is to provide such a machine employing hydraulically powered movable parts using the standard water pressure available in restaurants for all powering functions, and therefore minimizing the time and expense of installing and operating the machine.

Figure 4:
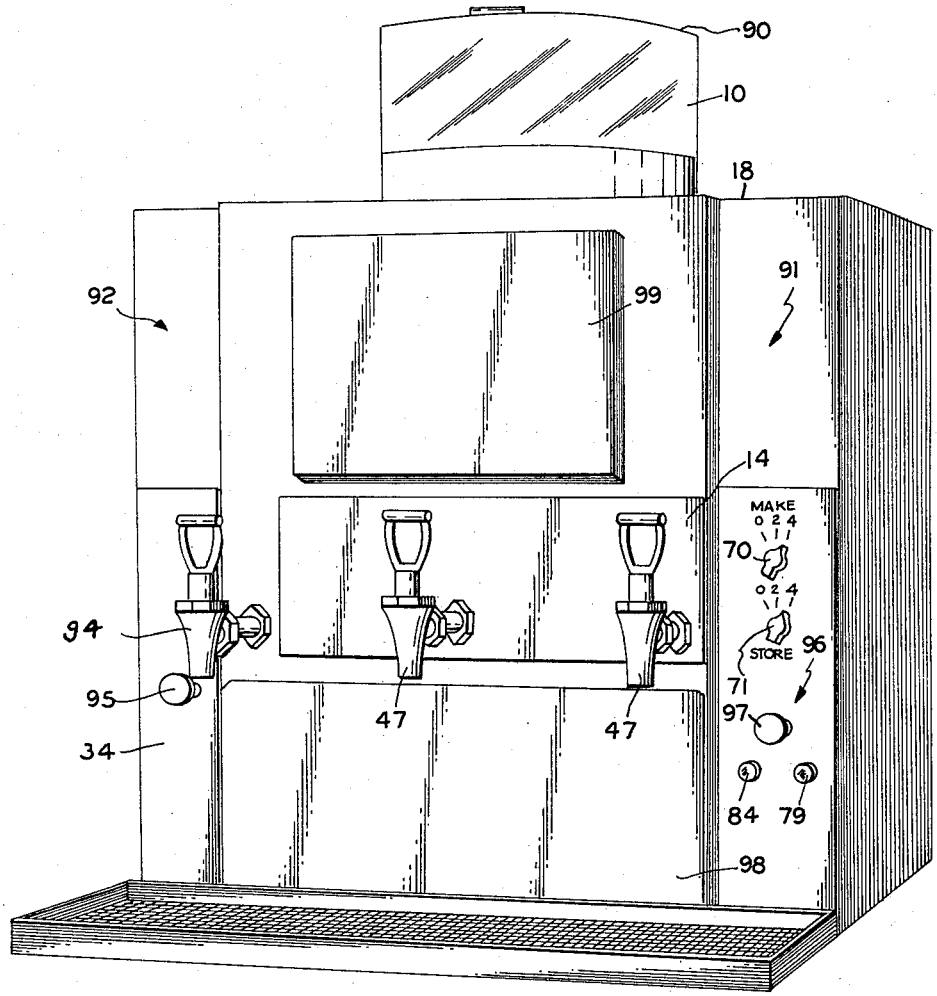
Figure 5:
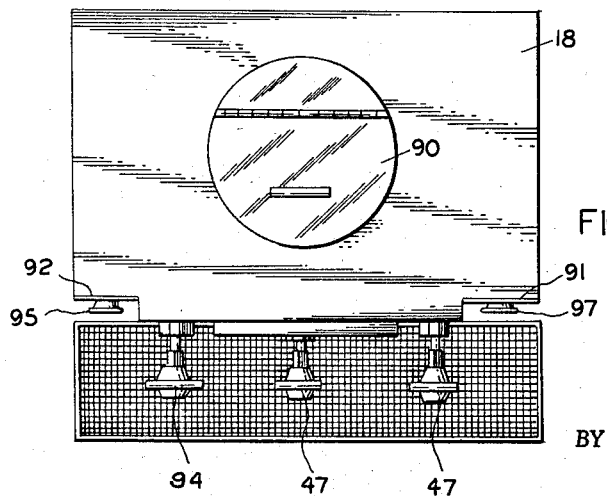
Figure 6:
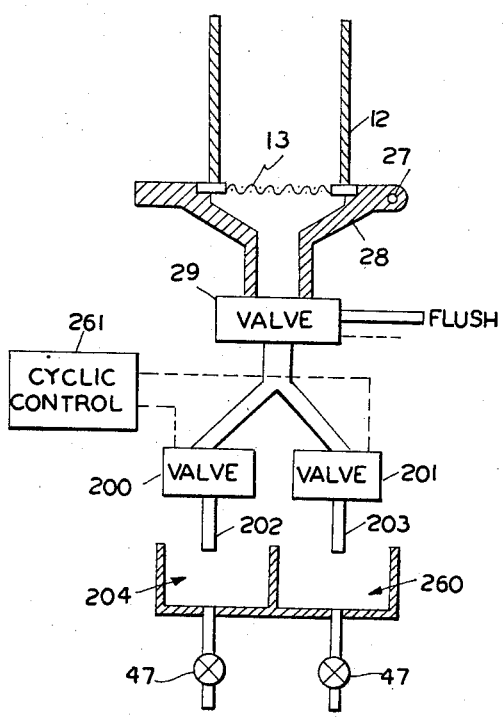
Figure 7:
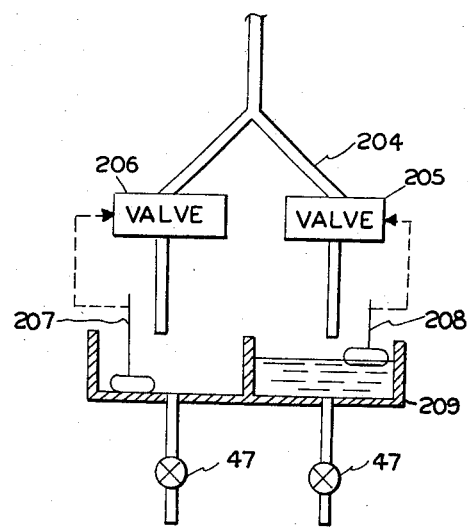
Figure 8:
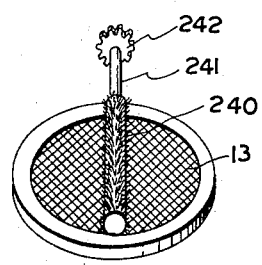

Other objects and many additional advantages will be more readily understood by those skilled in this art after a detailed consideration of the following specification taken with the accompanying drawings wherein:

FIG. 1 is an elevational view, partly in schematic form, illustrating major operating components of the machine according to the invention, FIG. 2 is a view of the cyclically operating timing mechanism, FIG. 3 is an electrical schematic illustration showing the electrical controls including the programmable controls for the machine, FIG. 4 is a perspective view of the cabinet of the machine, and FIG. 5 is a top plan view of the cabinet, and FIGS. 6 to 8 illustrate additional component parts of machine for storage of the beverage and cleaning the filter, respectively.

Referring initially to FIGS. 1 and 2, the machine comprises a storage hopper 10 for retaining a comparatively large supply of ground coffee, a metering cup 11 disposed below the hopper 10 for supplying measured quantities of coffee to a stationary open ended brewing cylinder 12, a pivotable cover containing a filter 13 located at the base of the brewing cylinder 12 for separating the beverage from the infused coffee grounds, a storage drawer 14 for storing and dispensing the coffee beverage, and a series of valves for metering the admission of both hot and cold water used in the coffee brewing process as well as controlling the mechanical movements of the main functioning parts through hydraulic actuators 15 and 16. An electric motor driving a cylically operating control mechanism, shown in FIG. 2, operates the valves in predetermined timed relationship during each cycle to control each of the steps of mixing the coffee and water, filtering the beverage, and cleaning the operating parts and filter during each cycle; and an electrical control system, shown in FIG. 3, controls the cycling of the machine according to two independently programmable selectors 70 and 71 that a manually adjustable by a human operator to preselect the quantity of beverage produced during each cycle and to independently preselect the quantity of beverage stored in the storage drawer.

Returning to FIG. 1 for an understanding of the coffee making process during each cycle, the coffee hopper 10 disposed at the top of the machine is sufficiently large to contain 25 pounds or more of ground coffee capable of producing many gallons of beverage. This hopper is provided at the top with a pivotally openable lid 90 for inserting the ground coffee and is funnel shaped at its base to open through the top wall 18 of the cabinet of the machine into the open ended measuring cup 11. The measuring cup 11 is reciprocally slidable in a horizontal channel provided by the wall 18 and a wall 19 located beneath the hopper 10. When the cup 11 is below the hopper, the cup is filled with ground coffee, and when the cup is positioned to the left by a hydraulic actuator 16, the base of the cup passes over an opening 20 in the wall 19 and deposits the coffee into the brewing cylinder 12 and onto the filter screen 13.

At its right hand upper end, the cup 11 is attached to a plate 21 that covers the open base of the hopper 10 when the cup 11 is moved to the left. This seals the hopper against the escape of coffee as well as preventing water vapor or spray from seeping upwardly into the ground coffee.

In the next step of the cycle, a valve 22 is operated to admit preheated water at the precise temperature desired into the brewing cylinder 12 through pipe 23 and tangential openings 24 near the base of cylinder 12. This tangential injection and swirling of the water into the cylinder under pressure thoroughly mixes and infuses the ground coffee, and since the relative proportions and temperature are precisely controlled, provides an optimum extraction of the beverage. The brewing time in the cycle is also precisely controlled and the infused coffee grounds are retained in the cylinder for the preset time desired after which a valve 25 is operated in the conduit leading from the filter to permit the beverage to pass through the filter 13 and through valve 25 and pipe 26 into the coffee storage drawer 14.

Upon completion of the time interval for filtering the beverage, the valve 25 is closed by the cyclic operating mechanism and a series of other valves are operated for removing the expended coffee grounds and cleaning the machine in preparation for the next coffee making cycle. Initially, the valve 26 is operated to energize the hydraulic actuator 15. This actuator pivots the dish shaped member 28 containing the filter 13 about its pivot 27 to open the base of the brewing cylinder 12. When the base 28 is tilted away from the brewing cylinder, the valves 29 and 30 are next operated to admit flushing water under pressure. The valve 30 provides flushing water through conduit 31 leading to a series of openings 32 at the top of the brewing cylinder and the resulting spray of water through the cylinder thoroughly washes the interior wall of the cylinder to remove coffee particles, oils, acids, or other residue that may have accumulated, and directs the flush water and residue into a shroud 33 disposed underneath the cylinder 12 and base member 28. The valve 29 admits flush water under pressure into the base member 28 and in the reverse direction through the filter 13. Since the base 28 has been previously tilted away from the cylinder 12, this flush washes away the expended coffee grounds on the filter which are carried away by the stream of flush water into the trough 33, and in turn directed into the coffee ground collection drawer 34. The collection drawer 34 is provided with a screen covered opening 35 permitting the liquid residue to pass into a drain while collecting the expended coffee particles in this removable drawer for later disposal at the convenience of the restaurant.

To obtain optimum extraction of the beverage during the coffee brewing period, the outside of the brewing cylinder is initially preheated by a spray of hot water to maintain the temperature during brewing constant. This is performed by operating the valve 41 at the beginning of each cycle to direct hot water from conduit 42 to a series of nozzles disposed about the outside of the cylinder, near the top of the cylinder. A cylindrically shaped deflector 44 is spaced about the outside of the cylinder to confine the hot spray water and direct it through a conduit 45 to the drain collector 33.

FIG. 2 illustrates the cylically operating mechanism for sequentially operating the valves for predetermined control periods during each cycle. As shown, this mechanism comprises an electric motor 54 driving a timing shaft 55 to rotate a series of variously contoured cams 56, 57, 60, 61, 63, 64, 65, 66, and 67. Each of these cams reciprocally positions a cam follower associated therewith that directly operates a different one of the valves in predetermined time sequence and for predetermined time intervals as discussed above. The two main mechanically movable portions of the machine comprising the movable coffee measuring cup 11 and the pivoting base member 28 are each positioned by a hydraulically operated piston actuator 15 and 16 (FIG. 1) through valves 26 and 45, respectively, so that cylic timing mechanism of FIG. 2 controls these mechanically moving parts as well as controlling the admission of hot and cold water for mixing, cleaning, and flushing as discussed above. The advantage of this arrangement is that the machine is primarily hydraulic in nature and uses the available supply of city water for not only making the coffee and cleaning the machine but for the power necessary to position the moving parts. Accordingly, the cycling motor 54 need only be a small low power unit for rotating the timing shaft 55 and the timing cams. The system of valves may be a series of individual valves of types available on the open market that are compactly assembled in side-by-side order above the timing shaft 55 as shown in FIG. 2. Alternatively for purposes of reducing size, weight, and cost, the valves may be constructed within a single block (not shown) that is molded of plastic or machined to provide a series of separate valve compartments having a reciprocally positionable valve member in each compartment. Applicant's earlier Patent No. 2,827,845 discloses further details of construction that may be used. For controlling the time interval of operation of each of the valves the cams are individually contoured suitably so as to close and open the valves at predetermined positions and for predetermined time periods during each rotation of the time shaft 55. Consequently each rotation of the shaft 55 completes one cycle of operation of the machine to prepare a preset quantity of coffee and to remove the expended coffee grounds and flush the machine in preparation for the next cycle. To program the machine for selectively producing a greater quantity of coffee during each cycle, one or more additional timing cams 57 is provided on the shaft 55 for controlling the dispensing of a greater quantity of ground coffee into the brewing cylinder during each cycle and one or more additional timing cams 61 is provided for controlling the dispensing of additional hot water into the brewing cylinder 12. The additional cam 57 is positioned alongside of cam 56 but spaced therefrom by springs 68 is reciprocally slidable on the timing shaft 55 but keyed thereto to always rotate with the shaft. It is normally positioned out of contact with the cam follower 58, and therefore the follower 58 normally follows the contour of cam 56 to operate the valve 45 which controls the movement of the coffee measuring cup 11 as discussed above in FIG. 1. When it is desired to change the quantity of coffee produced during the cycle, a solenoid 62 is energized to axially position the cam 57 to the left on shaft 55 and into engagement with the cam follower 58 so that the combination of the two cams 56 and 57 controls the operation of valve 45. For doubling the quantity of coffee produced during each cycle, the second cam 57 contains a substantially identical contour to cam 56 but is angularly displaced from cam 56 on shaft 55. Consequently during each rotation of the shaft, the cam follower is first actuated by cam 56 to dispense the measuring cup of ground coffee and then is again operated to dispense a second cup of ground coffee into the cylinder 12. Thus when the solenoid 62 is energized, the ground coffee dispensing control valve is operated twice during each cycle to double the amount of coffee emptied into cylinder 12. The additional cam 61 associated with the hot water mixing valve 22 operates in substantially the same manner. When it is positioned alongside of its associated cam 60 by operation of the solenoid 62, it assists cam 60 in controlling the admission of hot water into the brewing container for a time period that is twice as long as if cam 60 were operating alone and consequently doubles the amount of hot water mixed with the coffee grounds during each cycle. For programming the quantity of coffee beverage produced, the solenoid 62 is energized by the human operator adjusting a control knob 70 on the outside panel of the machine. Where the control knob is in either "off" position or "2" quart position, the solenoid 62 is deenergized and the valves 45 and 22 are operated by cams 56 and 64, respectively, and when the knob 70 is set at the "4" quart position, a switch 71 is closed to jointly position the cams 57 and 61 as discussed above to double the quantity of ground coffee and hot water mixed during each cycle. These additional cams may be otherwise contoured to produce different quantities of coffee or additional cams may be used to program greater quantities of coffee during each cycle. The program switch may be automatically operated by a time clock if desired, rather than manually to adjust the quantities of coffee produced at different times of the day such as at the meal hours.

FIG. 3 illustrates the preferred electrical controls and indicators for the machine and the interconnection of the program controls. As discussed above, the preferred embodiment is provided with two manually adjustable knobs 70 and 71 that can be operated by the human operator. The first knob 70 provides the function of turning the machine "off" and "on" and programming the quantity of coffee beverage made during each cycle. The second knob 71 provides the function of programming the quantity of prepared beverage that is stored in the machine.

By positioning knob 70 from "off" to either the "2" quart or "4" quart positions, a switch 75 is closed to energize the start relay 76 which closes its three contacts 76a, 76b, and 76c. The closing of contact 76a energizes the thermostatically controlled coffee storage heater 48, located underneath the coffee storage drawer 14, thereby to maintain the beverage in the drawer 14 at a constant temperature. The closing of contact 76c applies 220 volt electrical power to a hot water heater located in the water inlet tank 77 and it energizes a relay 78 and a red indicator 79 located on the cabinet to indicate that the water tank is being heated to the proper temperature for making coffee. The energizing of relay 78 opens its normally closed contact 78a in series with the motor 54 and therefore even though contact 76b is closed when the "make" knob 70 is poistioned to "2" or "4" by the operator, the motor 54 is not energized to commence the coffee making cycle.

When the inlet water in tank 77 reaches the desired temperature of 204° F. for making coffee a thermostat 80 opens to deenergize the hot water electric heater in tank 77 and also deenergizes the red indicator 79 and the relay 78 which closes its contact 78a. The closing of contact 78a thereupon completes the circuit to energize motor 54 and the motor commences rotation of timing shaft 55 (FIG. 2) to operate the cams and cycle the machine as described above. When the motor starts rotating, it also rotates a cam 82 to close switch 83 which will remain closed until the timing shaft makes a complete rotation. The reason for this is that if the thermostat should close during the coffee making cycle to open contact 78a it will not interrupt the completion of that cycle of operation of the machine. A green indicator 84 is also provided across motor 54 which will be illuminated when the machine is cycling to produce coffee.

The machine will automatically repeat cycles and continue making coffee beverage in a repetitive manner until commanded to stop by the human operator turning the knob 70 to "off" or until operation of the program relay 85 which opens its contact 85a to deenergize the motor 54. This relay 85 is controlled according to a preselected program to store a predetermined quantity of coffee in the storage drawer 14.

For programming the storage quantity, the manually selectable control knob 71 permits the human operator to select the quantity of beverage stored in drawer 14 and a float detector 45 located in the coffee storage drawer 14 detects the quantity of beverage stored in the drawer. As the beverage is prepared and progressively fills the drawer 14, the float progressively rises with the level of coffee and progressively closes switches 51, 52, and 53 at different levels. When one gallon or more is stored, the switch 51 is closed, when two gallons or more are stored the switch 52 is closed and when four gallons or more are stored the switch 53 is closed. The programmer selector knob 71 operates a multiposition switch, as shown, that selectively interconnects with each of the different level switches 51, 52 and 53. Consequently, when knob 71 is set at one gallon of storage and coffee level switch 51 is closed by the float 45 rising to this level in the drawer 14, then power is applied to the program control relay 85 to open its contact 85a in the circuit of motor 54 and accordingly denergize the motor 54 and discontinue the coffee making operation. This operation is similar for all other positions of the program storage switch 71. In the event that the program control relay 85 is energized during a coffee making cycle the opening of contact 85a does not discontinue the cycle already started but permits this cycle to terminate and then stops the machine. This is performed by the cam operated switch 83 that bypasses contacts 78a and 85a during each cycle and is opened by the cam 82 at the end of that cycle. The coffee storage drawer 14 is provided with sufficient capacity to store two or more quarts more than the maximum capacity set by knob 71.

FIGS. 4 and 5 illustrate the cabinet of the machine and the arrangement of parts. As shown the cabinet is generally rectangular in shape having planar front, side and top panels and is provided with offset portions 91 and 92 at the sides. The removable coffee storage drawer 14 is located at the front panel and the face of the drawer covers the drawer opening in the panel. Two dispensing faucet valves 47 are provided in the front face of the drawer so that coffee can be dispensed from one or both faucets together. In alignment with these faucets 47 is a third faucet 94 for dispensing hot water for tea or other beverage, and this faucet 94 is connected by suitable conduit to the hot water tank 77. The expended coffee ground collection drawer 34 is located in the left hand wing 92 of the cabinet and is also accessible from the front. This drawer is provided with a knob 95 and can be periodically removed, when convenient, and the collected coffee grounds disposed of. In one preferred arrangement, all of the electrical controls, including the programmnig switches, relays, and fuses are located in the third removable drawer 96 disposed in the right hand wing of the machine, and this drawer is provided with a knob 97 so that this modular unit containing eletcrical parts can be removed for servicing or replacement. In the event of a failure of any one of these electrical parts, the complete drawer 96 is removed and a substitute drawer is inserted so that the machine is not disabled during repairs. Detachable electrical connectors (not shown) electrically interconnect the parts in drawer 96 with the motor and other electrical parts not housed in the drawer 96.

The hot water tank 77 is located behind the lower panel 98, which may be removed for servicing; and the brewing cylinder 12, base 28 and associated parts are disposed behind the upper removable panel 99 and located below the coffee hopper 10, as shown in FIG. 2. The case is also provided with pivotally openable side walls and/or rear walls so that all parts are accessible for repairs if needed.

FIGS. 6 and 7 illustrate additional features of the machine for the purpose of separately storing freshly made coffee from coffee beverage that has been previously prepared and stored in the coffee storage drawer. In the embodiment of FIG. 6, the coffee storage drawer is provided with a series of separate compartments 204, and 260 each of which is adapted to receive and store coffee on alternate cycles of operation of the machine. During a first cycle of operation, for example, the valve 201 is operated by the cyclic control 261, which may be an additional cam on the timing shaft 55 in FIG. 2, and the filtered beverage from the brewing cylinder 12 is directed through valve 201 and over conduit 203 to storage compartment 260. At the next cycle of operation of the machine, the other valve 200 is operated to direct the coffee beverage to another compartment 204 of the storage drawer. A faucet 47 is provided for each compartment of the drawer.

In the alternative embodiment of FIG. 7, the coffee storage drawer is also provided with a series of compartments adapted to selectively receive and store the beverage. Each of these compartments is provided with a float, such as 207 and 208, or other suitable detector to determine when that compartment is empty of beverage. Each float or detector is connected to operate its associated valve 206 or 205, respectively in the conduit leading to the coffee brewing container. When the float or detector determines that its compartment is empty of coffee, it closes its associated valve whereby upon the next coffee making cycle, the beverage is directed to the empty compartment.

FIG. 8 illustrates a brushing mechanism that may be incorporated within the brewing cylinder to assist in the removal of the expended coffee grounds from the filter 13. As discussed above, the filter 13 is normally cleaned of the expended coffee grounds and residue by reverse flushing of cold water therethrough upon actuation of valve 29 during each cycle. However, in restaurant installations when the water pressure may be low, a brushing or agitating of the filter 13 may be desirable to assist in the removal of the expended coffee grounds. In this embodiment, a cylindrical brush 240 is employed and supported by shaft 241 within the brewing cylinder 12. The shaft is rotated and translated as necessary to provide a scrubbing of the screen 13 by suitable gearing 242 adapted to be driven by hydraulic actuator 15 (FIG. 1).

Although but preferred embodiments of the invention have been illustrated and described it is believed evident that many changes may be made by those skilled in the art without departing from the spirit and scope of this invention. Accordingly this invention is to be considered as being limited only by the following claims.

What is claimed is:

1. A programmable automatic coffee brewing machine comprising: cyclically operating automatic means for measuring and thoroughly infusing preset quantities of ground coffee and hot water, means controlled by said cyclically operating means for filtering the resulting coffee beverage from the expended ground coffee, and programmable means presettable by an operator for varying said cyclically operating means to measure and infuse a greater quantity of ground coffee and hot water in substantially the same relative proportion during each cycle of operation of the machine.

2. A programmable automatic coffee brewing machine comprising: cyclically operating automatic means for measuring and thoroughly infusing preset quantities of ground coffee and hot water, means controlled by said cyclically operating means for filtering the resulting extraction beverage from the expended ground coffee and storing the beverage, and programmable means presettable by an operator for adjustably controlling said cyclically operating means to continually cycle and maintain different preset quantities of beverage in storage.

3. A programmable automatic coffee brewing machine comprising: cyclically operating automatic means for mixing and infusing preset proportions of ground coffee and hot water, means controlled by said cyclically operating means for separating the resulting coffee extraction beverage from the expended coffee grounds and storing the beverage, programmable means selectively presettable by an operator for adjustably varying said cyclically operating means to mix a greater quantity of ground coffee and hot water, and independent programmable means selectively presettable by the operator to store an adjustably preset quantity of beverage.

4. An automatic coffee infusion machine comprising: a modular cabinet having main body portion having a front panel and additional panels, a removable beverage storage drawer slidably supported in the body portion with respect to the front panel and having a front portion of the drawer seated against an opening in the front panel when the drawer is closed, a removable coffee ground collecting drawer slidably supported in and removable from the body portion with respect to the front panel and having an upright panel forming a portion of the front cabinet panel when the drawer is closed, a dispensing faucet supported by the front panel of the beverage storage drawer for dispensing the coffee, cyclically operating automatic means within the cabinet for mixing coffee ingredients and filtering the beverage, and programmable means presettable by an operator for adjustably controlling said cyclically operating means to continually cycle and maintain different preset quantities of beverage in said beverage storage drawer.

5. A programmable automatic coffee brewing machine comprising: cyclically operating automatic means for measuring and thoroughly infusing preset quantities of ground coffee and hot water, means controlled by said cyclically operating means for filtering the resulting coffee extraction beverage from the expended ground coffee, and selectively operable programmable means presettable by an operator for varying said cyclically operating means to measure and infuse a greater quantity of ground coffee and hot water in substantially the same relative proportion during the cycles of operation of the machine, and cyclically operating means including a constant speed cyclic timing means, a first control means operated by the timing means during each cycle for measuring and dispensing a preset quantity of ground coffee, second control means operated by the timing means for dispensing a present quantity of hot water, and said programmable means jointly varying said first and second control means to repetitively operate said first control means during each cycle according to the selected programmed quantity and correspondingly varying said second control means to maintain the proportion of coffee and hot water substantially constant while varying the quantity of produced beverage.

6. A programmable automatic coffee brewing machine comprising: cyclically operating automatic means for measuring and thoroughly infusing present quantities of ground coffee and hot water, means controlled by said cyclically operating means for filtering the resulting coffee extraction beverage from the expended ground coffee, and programmable means presettable by an operator for varying said cyclically operating means to measure and infuse a greater quantity of ground coffee and hot water in substantially the same relative proportion during each cycle of operation of the machine, said cyclically operating means comprising first and second control means for dispensing a fixed quantity of ground coffee during each cycle of said cyclically operating means and a correctly proportioned quantity of water, and said programmable means jointly varying said first and second control means according to the programmed setting to vary the quantity of beverage produced during each cycle while maintaining the proportion of hot water and coffee substantially constant.

7. An automatic coffee infusion machine comprising: a constant speed timing means, a plurality of separate control means actuated by said timing means at different periods of said cycle for independently mixing premeasured quantities of ground coffee and hot water, filtering the extracted beverage from the expended coffee, and cleaning the expended coffee grounds residue from the machine; and programmable means presettable by an operator to jointly adjust preselected ones of said separate control means for varying the quantity of beverage produced during each cycle of the timing means.

8. An automatic coffee infusion machine comprising: a constant speed timing means, a plurality of separate control means actuated by said timing means at different period of said cycle for independently mixing premeasured quantities of ground coffee and hot water, filtering the extracted beverage from the expended coffee, and cleaning the expended coffee grounds and residue from the machine; and programmable means presettable by an operator to jointly adjust preselected ones of said separate control means for varying the quantity of beverage produced during each cycle of the timing means, and second programmable means independently presettable by an operator for controlling the storage of different preselected quantities of beverage and automatically cycling the machine to maintain said preselected quantity constant.

9. In an automatic coffee brewing machine, a brewing container, and cyclically operating motor control means for dispensing and mixing premeasured quantities of ground coffee and hot water in said brewing container, means for cyclically preheating said container prior to the mixing of coffee and hot water therein, said means comprising spraying the outside of said container with hot water.

10. In a programmable automatic operating coffee infusion machine for cyclically producing and storing quantities of beverage extracted from ground coffee during each constant time cycle, programmable means selectively positioned by an operator for adjustably varying the quantity of beverage produced during each constant time cycle of the machine, and programmable means independently selectively positioned by an operator for adjustably varying the quantity of beverage stored by the machine and automatically cycling the machine to maintain such preselected quantity constant.

11. In an automatic coffee brewing machine for cyclially infusing ground coffee with hot water, filtering the extracted coffee beverage, and storing the beverage in a storage compartment; programming means for adjustably preselecting the quantity of beverage stored and automatically cycling the machine to produce and store additional beverage to maintain the quantity stored at the preselected amount, a storage compartment, said programming means comprising a multiquantity sensor means for detecting different quantities of beverage in the storage compartment, a multiposition selector interconnectable with said sensor means for preselecting one of a series of different quantities, and control means responsive to said selector for automatically cycling the machine when the stored quantity falls below the preselected quantity.

12. In the machine of claim 11, said multiquantity sensor including a plurality of switch contacts each adapted to be closed when a different preselected quantity of beverage is in storage, said multiposition sensor comprising a multiple switching means selectively connectable in circuit with a different one of said switch contacts, and means responsive to the opening and closing of the selected one of said switch contacts for operating said control means.

13. In an automatic coffee brewing machine for cyclically infusing ground coffee with hot water, filtering the extracted beverage from the expended coffee grounds, and storing the beverage; programming means for preselecting the quantity of beverage produced during each cycle of the machine, said programming means comprising a multiquantity selector, time control means for metering the quantity of ground coffee and hot water infused during each cycle, and control means interconnecting said multiquantity selector with said time control means to vary the quantity of ground coffee and hot water being metered during each cycle of the machine according to the quantity preselected by said multiquantity selector.

14. In a cyclically operating automatic coffee brewing machine for infusing ground coffee with hot water during each cycle, filtering the coffee beverage and storing the beverage; a filter means, and means for cleaning the filter means and removing the expended coffee grounds during each cycle, said means comprising a brushing means movably engaging the filter to dislodge entrapped coffee ground particles therein, means for reverse flushing the filter with water, and a time controlled operating mechanism for jointly actuating said brushing means and said flushing means during each cycle of operation of the machine.

15. In a cyclically operating coffee brewing machine for infusing ground coffee with hot water during each cycle, filtering the coffee beverage, and storing the beverage, a multiple compartment storage container for storing the beverage, means for determining whenever one of said compartments is empty of coffee, and means controlled by said determining means for storing the beverage produced at a future cycle in said empty compartment.

16. In a cyclically operating automatic coffee brewing machine for automatically mixing premeasured quantities of ground coffee and hot water during each cycle, filtering the beverage, storing the beverage, and removing the expended ground coffee and flushing the machine, a multiple compartmented storage container for storing the beverage, and means for directing the beverage produced during successive cycles to different ones of said compartments, said directing means including means for determining when one of said compartments is empty of beverage, and means responsive to said determining means for directing the beverage produced during future cycles to said empty compartment.

17. In an automatic coffee brewing machine, an open ended stationary infusion container, a pivotable base for said container having a filter, a ground coffee measuring means for dispensing a premeasured quantity of ground coffee into the upper end of the cylinder, a valve means for dispensing hot water into the cylinder to infuse the ground coffee, actuator means for operating said coffee ground measuring means and opening and closing the base of the cylinder, a second valve means for reverse flushing said filter to remove the expended coffee grounds, a third valve means for applying hot water to the outside of said cylinder to preheat the cylinder, a fourth valve means for applying flush water to the inside of said cylinder for cleaning, a cyclically operating timer means for sequentially operating said valve means and actuator means to initially mix and infuse the ground coffee and hot water, filter the beverage, then flush and clean the cylinder and filter; and programmable means for selectively varying the quantity of beverage produced during each cycle.

18. In the machine of claim 17, additional programmable means for repetitively operating said cyclically operating timer means to maintain an adjustably preselected quantity of beverage in a storage container.

19. In the machine of claim 17, said programmable means comprising a multiple contact switching means, and solenoid energized upon closure of one of the contacts of said multiple contact switching means, and means controlled by said solenoid to adjust said cyclically operating timer means to vary said ground coffee measuring means and said valve means for dispensing hot water in the cylinder.

References Cited
UNITED STATES PATENTS

| | | | |
|---|---|---|---|
| 2,252,614 | 8/1941 | Bowen | 99—283 X |
| 2,827,845 | 3/1958 | Richeson | 99—282 |
| 2,935,011 | 5/1960 | Perlman | 99—283 |
| 3,124,056 | 3/1964 | Hayes | 99—283 |
| 3,126,812 | 3/1964 | Nau | 99—283 |
| 3,171,344 | 3/1965 | Mathieu et al. | 99—283 |

WILLIAM I. PRICE, *Primary Examiner.*